United States Patent
Neubrand (10) Patent No.: US 7,182,390 B2
(45) Date of Patent: Feb. 27, 2007

(54) RETRACTABLE HARDTOP WITH ARTICULATING CENTER PANEL

(75) Inventor: Frank Neubrand, West Bloomfield, MI (US)

(73) Assignee: Wilhelm Karmann GmbH, Osnabruck (DE)

(*) Notice: Subject to any disclaimer, the term of this patent is extended or adjusted under 35 U.S.C. 154(b) by 0 days.

(21) Appl. No.: 11/259,577

(22) Filed: Oct. 26, 2005

(65) Prior Publication Data
US 2006/0061131 A1    Mar. 23, 2006

Related U.S. Application Data

(63) Continuation of application No. 10/827,562, filed on Apr. 19, 2004, now Pat. No. 6,964,340.

(60) Provisional application No. 60/464,020, filed on Apr. 18, 2003.

(51) Int. Cl.
*B60J 7/08*    (2006.01)

(52) U.S. Cl. .................................... 296/108

(58) Field of Classification Search ............. 296/108, 296/107.01, 121, 107.07, 107.16, 107.17
See application file for complete search history.

(56) References Cited

U.S. PATENT DOCUMENTS

| | | |
|---|---|---|
| 2,234,040 A | 3/1941 | Carr |
| 2,303,788 A | 12/1942 | Carr |
| 2,303,789 A | 12/1942 | Carr |
| 2,704,225 A | 3/1955 | Anschuetz et al. |
| 3,536,354 A | 10/1970 | Ingram |
| 4,619,480 A | 10/1986 | Motoyama et al. .......... 296/217 |
| 4,741,571 A | 5/1988 | Godette ....................... 296/107 |
| 4,805,956 A | 2/1989 | Saunders ..................... 296/107 |
| 4,840,419 A | 6/1989 | Kolb ........................... 296/108 |
| 4,948,194 A | 8/1990 | Dogliani ..................... 296/108 |
| 5,042,868 A | 8/1991 | Nothaft et al. .............. 296/107 |
| 5,067,768 A | 11/1991 | Fischbach .................... 296/107 |
| 5,098,148 A | 3/1992 | Hoban .......................... 296/66 |
| 5,195,798 A | 3/1993 | Klein et al. ............... 296/146 L |
| 5,295,722 A | 3/1994 | Bonne et al. ................ 296/121 |
| 5,558,389 A | 9/1996 | Rothe et al. ................ 296/107 |
| 5,746,470 A | 5/1998 | Seel et al. ................... 296/108 |
| 5,769,483 A | 6/1998 | Danzl et al. ................ 296/107 |
| 5,785,375 A | 7/1998 | Alexander et al. .......... 296/108 |

(Continued)

FOREIGN PATENT DOCUMENTS

DE    43 16 485 A1    11/1994    ................. 296/108

(Continued)

*Primary Examiner*—H Gutman
(74) *Attorney, Agent, or Firm*—Gifford, Krass, Groh, Sprinkle, Anderson & Citkowski, P.C.

(57) ABSTRACT

A retractable hardtop for use with a vehicle including a rear section pivotally coupled to the vehicle and a front section pivotally coupled to the rear section for movement of the hardtop between an extended position defining a roof over a passenger compartment in the vehicle and a retracted position at least partially stowed in a storage compartment. A balance link extends between one end pivotally coupled to the vehicle and an opposite end pivotally coupled to the front panel. A center panel opening is defined between the front and rear panels. A center panel is operatively coupled to the balance link for movement in and out of the center panel opening during movement of the hardtop between the extended and retracted positions, respectively.

20 Claims, 9 Drawing Sheets

U.S. PATENT DOCUMENTS

| | | | |
|---|---|---|---|
| 5,979,970 A | 11/1999 | Rothe et al. | 296/107.17 |
| 6,217,104 B1 | 4/2001 | Neubrand | 296/108 |
| 6,302,470 B1 | 10/2001 | Maass et al. | 296/107.07 |
| 6,315,349 B1 | 11/2001 | Kinnanen | 296/108 |
| 6,364,395 B1 | 4/2002 | Halbweiss et al. | 296/107.09 |
| 6,422,637 B1 * | 7/2002 | Mac Farland | 296/107.15 |
| 6,497,446 B2 | 12/2002 | Obendiek | 296/107.17 |
| 6,604,775 B2 | 8/2003 | Obendiek | 296/108 |
| 6,644,715 B1 | 11/2003 | Bohnke | 296/107.08 |
| 6,666,495 B2 | 12/2003 | Nania | 296/107.08 |
| 6,682,124 B1 | 1/2004 | Bohnke | 296/107.08 |
| 6,682,125 B2 | 1/2004 | Guillez et al. | 296/107.18 |
| 6,702,362 B2 * | 3/2004 | Eichholz et al. | 296/108 |
| 6,722,724 B1 * | 4/2004 | MacFarland | 296/107.17 |
| 6,736,444 B2 * | 5/2004 | Reinsch | 296/107.17 |
| 6,742,829 B2 * | 6/2004 | Reihl | 296/108 |
| 6,767,045 B2 * | 7/2004 | Reinsch | 296/107.17 |
| 6,796,597 B2 * | 9/2004 | Mac Farland | 296/107.17 |
| 6,820,917 B2 * | 11/2004 | Grubbs | 296/107.17 |
| 6,830,284 B2 * | 12/2004 | Guillez et al. | 296/107.17 |
| 6,857,687 B2 * | 2/2005 | Bruder | 296/108 |
| 6,964,340 B2 * | 11/2005 | Neubrand | 296/107.17 |
| 2001/0005089 A1 | 6/2001 | Neubrand | 296/76 |
| 2002/0050727 A1 | 5/2002 | Hasselgruber et al. | 296/107.17 |
| 2002/0135200 A1 | 9/2002 | DeGaillard | 296/107.01 |
| 2002/0158485 A1 | 10/2002 | Obendiek | 296/107.07 |
| 2002/0175536 A1 | 11/2002 | Biecker et al. | 296/107.01 |
| 2002/0185886 A1 * | 12/2002 | Obendiek | 296/108 |
| 2003/0038502 A1 | 2/2003 | Marold et al. | 296/107.01 |
| 2003/0098594 A1 | 5/2003 | Hahn | 296/107.01 |
| 2003/0127883 A1 | 7/2003 | Antreich | 296/107.01 |
| 2003/0197396 A1 * | 10/2003 | Eichholz et al. | 296/108 |
| 2003/0230907 A1 * | 12/2003 | Sasaki et al. | 296/7 |
| 2004/0004369 A1 * | 1/2004 | Neubrand et al. | 296/108 |
| 2004/0119316 A1 * | 6/2004 | Rosler et al. | 296/108 |
| 2004/0155482 A1 * | 8/2004 | Netzel et al. | 296/108 |
| 2004/0174039 A1 * | 9/2004 | Dilluvio | 296/107.17 |
| 2004/0207232 A1 * | 10/2004 | Neubrand | 296/107.17 |
| 2005/0029833 A1 * | 2/2005 | Obendiek | 296/108 |
| 2005/0184554 A1 * | 8/2005 | Queveau et al. | 296/108 |
| 2006/0061131 A1 * | 3/2006 | Neubrand | 296/108 |
| 2006/0097543 A1 * | 5/2006 | Russke | 296/107.16 |
| 2006/0125281 A1 * | 6/2006 | Brockhoff | 296/107.01 |

FOREIGN PATENT DOCUMENTS

| | | |
|---|---|---|
| DE | 101 16 709 C2 | 3/2003 |
| EP | 0 835 779 B1 | 4/1998 |
| EP | 0 835 780 B1 | 4/1998 |
| EP | 1 247 676 A1 | 9/2002 |

* cited by examiner

RETRACTABLE HARDTOP WITH ARTICULATING CENTER PANEL

REFERENCE TO RELATED APPLICATIONS

This application is a continuation of U.S. patent application Ser. No. 10/827,562, filed Apr. 19, 2004 now U.S. Pat. No. 6,964,340, which claims priority from U.S. provisional patent application Ser. No. 60/464,020, filed Apr. 18, 2003, the entire content of both of which is incorporated herein.

FIELD OF THE INVENTION

The invention relates to retractable hardtops for automotive vehicles. More particularly, the invention relates to a hardtop having a center panel that is movable between front and rear panels when the hardtop is in the retracted position to provide additional luggage space.

BACKGROUND OF THE INVENTION

Most vehicles have rigid roof structures that permanently extend over and cover the passenger compartment. Manufacturers also provide a variety of designs that offer the vehicle operator the opportunity to partially or completely uncover the passenger compartment. Sunroofs and moonroofs are some of the simplest designs and offer the opportunity to open a portion of the vehicle roof for increased airflow. More complicated designs allow the entire roof structure to be retracted and stored behind the passenger compartment.

Retractable roof systems generally fall into two categories. The most common type of retractable roof design is a convertible soft top or roof. These designs include an articulating structural framework with a flexible cloth or plastic outer skin. In an extended position, the front end of the articulating framework connects to a header above the vehicle windshield and the outer skin extends over the passenger compartment. When retracted, the articulating mechanism, along with the outer skin, folds into a compact shape. While convertible soft tops offer the choice between a covered or uncovered passenger compartment, they also suffer from several disadvantages in comparison to traditional rigid roof structures. Vehicles with soft tops are typically less well sealed against the elements and are somewhat noisy. They are also less resistant to break-in attempts and have a less finished interior appearance.

The other retractable roof design is a retractable or folding hardtop roof system. Retractable hardtops consist of one or more rigid roof elements that are mechanically articulated such that they can be repositioned into a storage area behind the passenger compartment. Because the retractable hardtop consists of rigid sections, the system can provide a much closer approximation of a traditional rigid roof structure. In the extended position, a retractable hardtop securely covers and seals the passenger compartment, giving the appearance of a permanent roof. A retractable hardtop does a significantly better job of sealing the passenger compartment, reducing noise, and preventing break-ins. However, the retraction and storage of the hardtop presents significant mechanical challenges. Typically, when the retractable hardtop is in the retracted position, it resides in the portion of the vehicle traditionally provided for storage, such as the vehicle's trunk. While the storage space may be completely usable when the hardtop is in the extended position, most consumers prefer not to sacrifice the use of the storage position when the roof is retracted. There is generally a tradeoff between storage efficiency and mechanical complexity.

Most modern retractable hardtop designs consist of two or more articulated sections that are automatically folded or stacked in the storage area. In one design, referred to as a "clamshell" design, the roof structure is divided into a front section and a rear section. The front and rear sections are pivotally interconnected and the rear section is pivotally connected to a support structure behind the passenger compartment. Examples of clamshell type retractable hardtop designs are shown in U.S. Pat. Nos. 6,271,104 to Neubrand, and 5,785,375 to Alexander et al.

In a clamshell design, the front and rear sections may both be the to have an inner and an outer surface, with the outer surfaces cooperating to form the outer surface of the roof structure when in the extended position. When retracted, the front section folds so as to bring the inner surface of the front section towards the inner surface of the rear section, and both sections are together positioned into the storage area. Often, the deck lid of the vehicle articulates into an out-of-the-way position to allow the hardtop sections to move into a position in the trunk. The deck lid is then repositioned to cover the pair of roof sections. In most designs, the front and rear sections both have generally convex outer surfaces and concave inner surfaces. Therefore, when the inner surfaces are folded towards one anther, the concave shapes cause there to be a significant distance between the mid-portions of the folded front and rear sections. Consequently, clamshell designs do not store as compactly as some other designs. Their advantage is that they are significantly less complex than most other designs. Reduced complexity not only reduces manufacturing costs, but also improves reliability of the system. Clamshell designs also have better structural integrity than some other designs.

An alternative design, which provides improved storage efficiency, may be referred to as a "stacking" design. Again, the roof is divided into two or more sections. However, when the hardtop is retracted, the roof sections are stacked such that the inner surface of one section is adjacent to the outer surface of another section. Because each section typically has a concave inner surface and a convex outer surface, placing the inner surface of one section next to the outer surface of another often results in more efficient space utilization. Examples of stacking retractable hardtop designs are shown in U.S. Pat. Nos. 6,336,673 to Rothe et al., 6,318,793 to Rapin et al., 6,053,560 to Rothe, and 5,979,970 to Rothe et al. As will be clear to those of skill in the art, stacking designs require significantly more complex articulation mechanisms than clamshell designs. This increased complexity leads to increased costs, reduced reliability, and reduced structural integrity.

SUMMARY OF THE INVENTION

According to one aspect of the invention a retractable hardtop system is provided for use with a vehicle having a body defining a passenger compartment extending between a front windshield and a rear storage area. The hardtop system is movable between an extended position, wherein the hardtop system defines a roof over the passenger compartment and a retracted position, wherein at least a portion of the hardtop system is disposed in the storage area. The hardtop system includes a rear section pivotally coupled with the vehicle body. A front section is pivotally coupled with the rear section. The front section extends between the front windshield and the rear section when the hardtop is in the extended position. A center panel opening is defined between the rear and front sections. A balance link has a first end pivotally interconnect with the front section and a second end pivotally interconnected with the vehicle body. A center panel is interconnected with the balance link for movement therewith. The center panel and balance beam link are configured such that when the top is in the extended position, the center panel fills the center panel opening and when the top is in the retracted position, the center panel moves out of the center panel opening.

According to another as aspect of the invention, the balance link includes a mid-portion extending between the first and second ends. The mid-portion of the balance link is operatively connected to the center panel, whereby the center panel remains generally parallel with the balance link during movement of the hardtop between the extended and retracted positions.

DETAILED DESCRIPTION OF THE INVENTION

The present invention provides a retractable hardtop that is a modified clamshell design for use with an automotive vehicle. The hardtop includes articulating main front and rear sections. The hardtop also includes a center panel disposed between the front and rear sections that articulates independently of the remainder of the hardtop, so as to provide for more compact storage.

Figure 1:
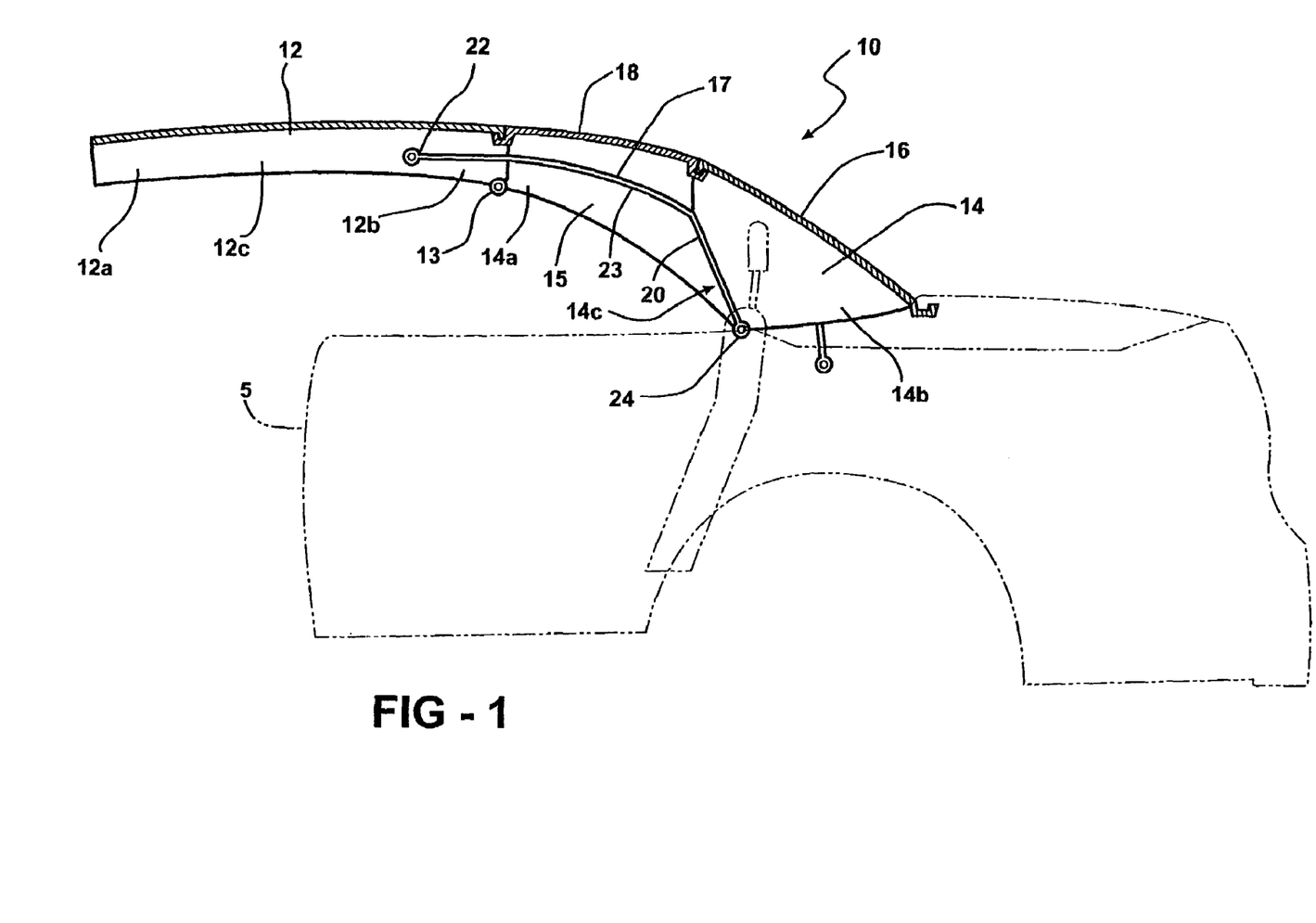
FIG. 1 is a side-elevational view of a portion of a vehicle with a first embodiment of a retractable hardtop according to the present invention.
Figure 3:
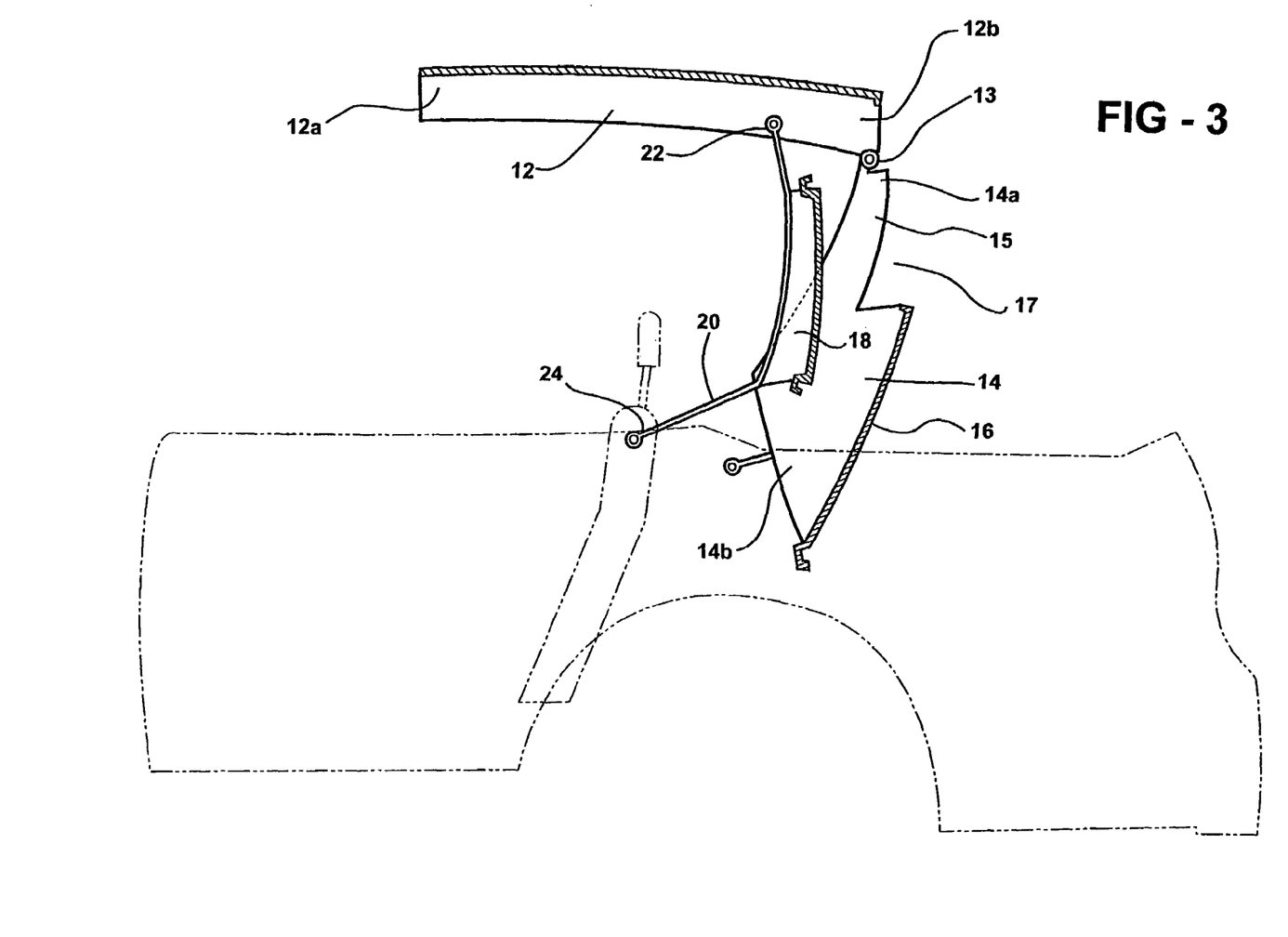
FIG. 3 is a side-elevational view with the top in a more retracted position than is shown in FIG. 2.
Figure 4:
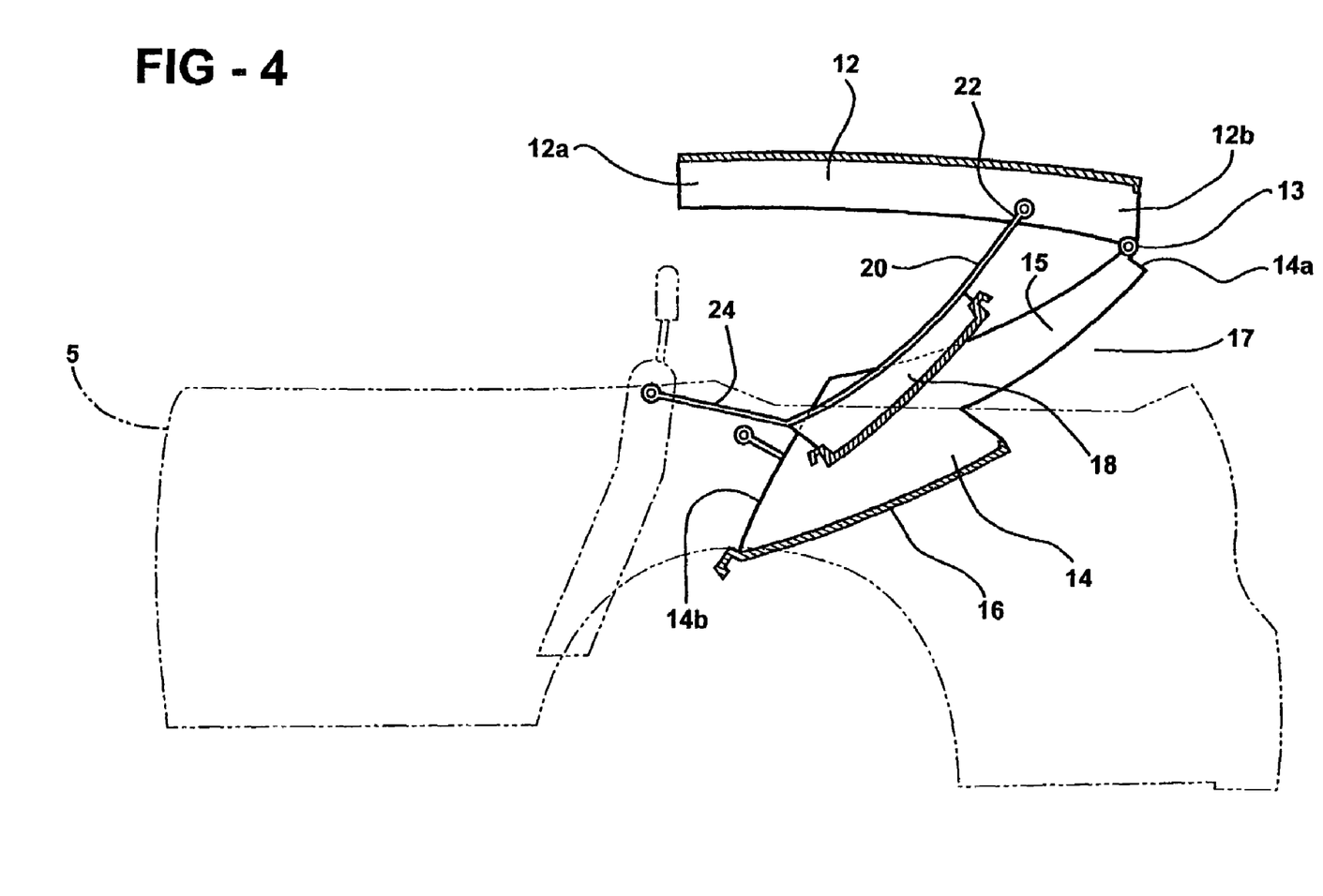
FIG. 4 is a side-elevational view with the top in a more retracted position than is shown in FIG. 3.
Figure 5:
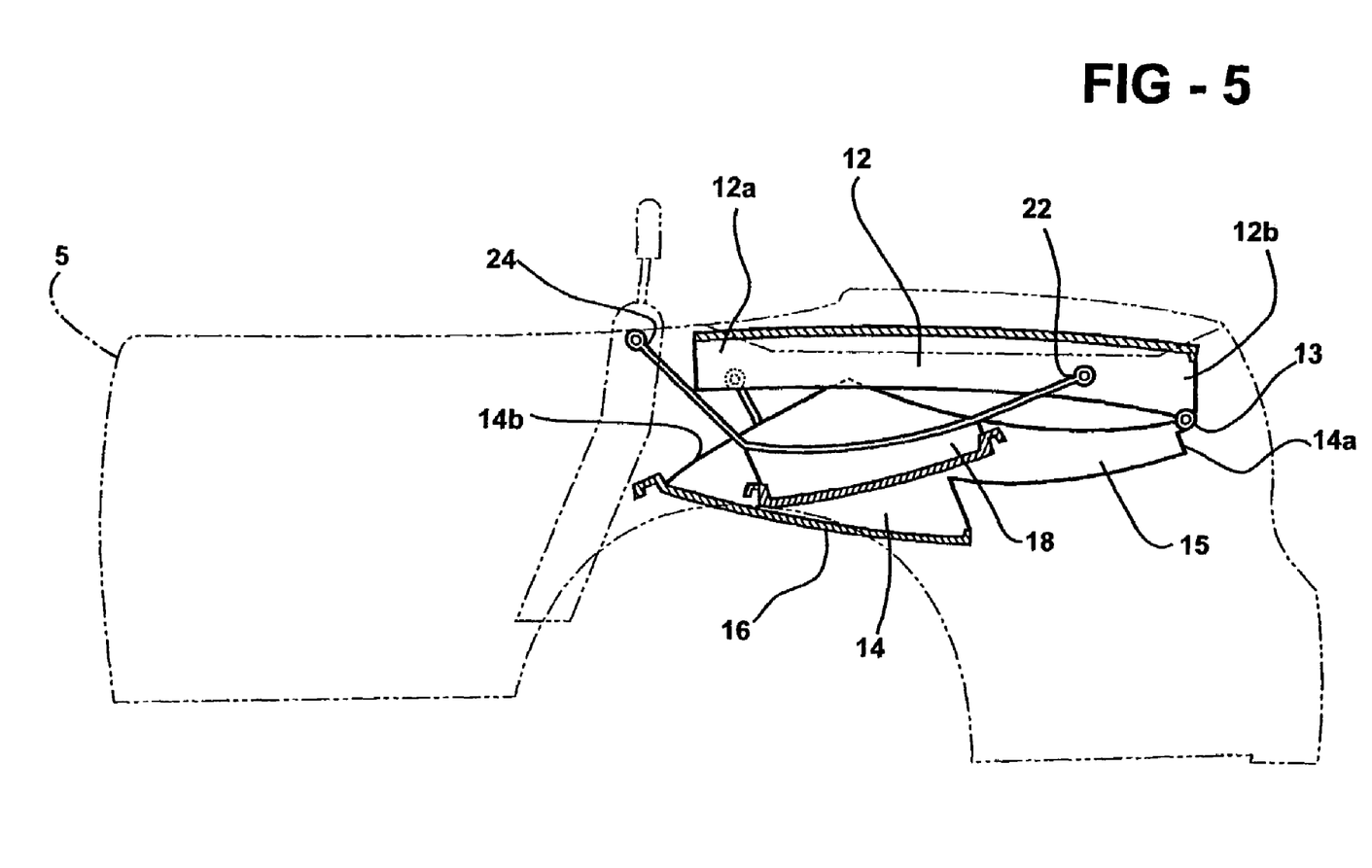
FIG. 5 is a side-elevational view with the top in the fully retracted position.
Figure 6:
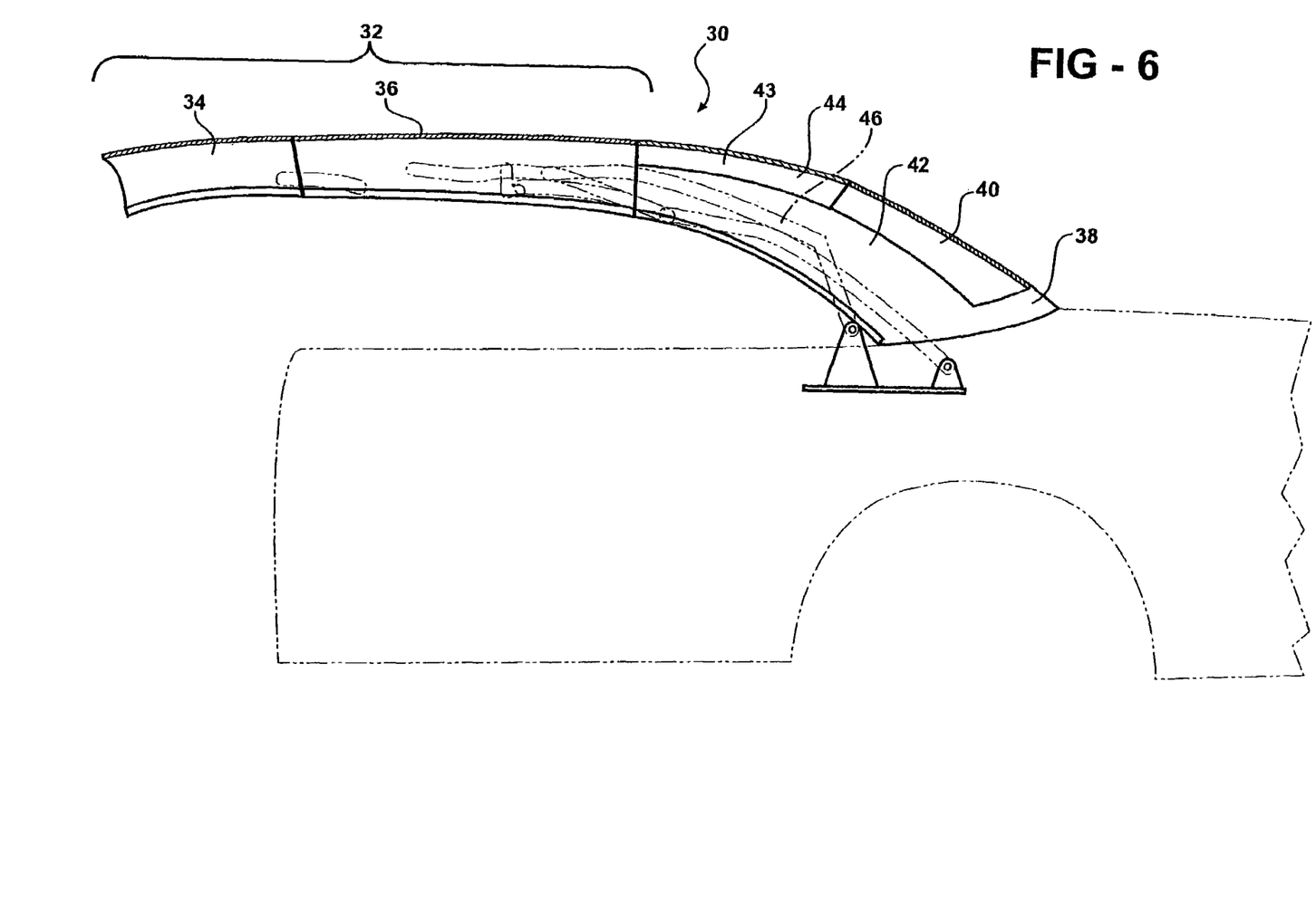
FIG. 6 is a side-elevational view of a second embodiment of a retractable hardtop according to the present invention, with some portions of the corresponding vehicle illustrated for context.

FIGS. 1 through 5 illustrate a first embodiment of a retractable hardtop 10. The hardtop 10 includes a front section 12 and a rear section 14. The rear section 14 includes a front end 14a and a rear end 14b. The front end 14a of the rear section 14 is generally forward of the rear end 14b when the hardtop 10 is in the extended position. The front section 12 also includes a front end 12a and a rear end 12b. The rear end 14b of the rear section 14 is pivotally coupled to the vehicle body 5 and the rear end 12b of the front section 12 is pivotally coupled to the front end 14a of the rear section 14 by a pivot 13 to allow movement of the hardtop 10 between an extended position, as shown in FIG. 1, and a retracted position, as shown in FIG. 5. This movement is described in greater detail below.

The rear section 14 includes a backlight 16 extending between spaced apart side portions 15. A center panel opening 17 is defined between the backlight 16 and the rear end 12b of the front section 12 and extends between the side portions 15. In a typical clamshell design, there is no such center panel opening and the backlight 16 either extends farther forwardly, or a rigid portion extends between the side portions 15 forwardly of the backlight 16. In the present invention, a center panel 18 fills this position, the center panel opening 17, and articulates independently of the front 12 and rear 14 sections. More specifically, a balance link 20 has a forward end 22 and a rearward end 24. The forward end 22 of the balance link 20 is pivotally interconnected to the front section 12. The rearward end 24 is pivotally interconnected to, or otherwise in mechanical communication with, the vehicle body 5. A mid-portion 23 of the balance link 20 extends between the forward 22 and rearward 24 ends. The center panel 18 is connected to the mid-portion 23 of the balance link 20 for movement in and out of the center panel opening 17 during movement of the hardtop 10 between the extended and retracted positions, respectively. Moreover, the center panel 18 remains generally parallel with the balance link 20 throughout the movement of the hardtop 10 between the extended and retracted positions. The balance link 20 also helps to define the motion profile of the front section 12 relative to the rear section 14. As will be clear to those of skill in the art, a balance link 20 is preferably provided adjacent each side of the hardtop 10, and the center panel 18 is connected to both.

Figure 2:
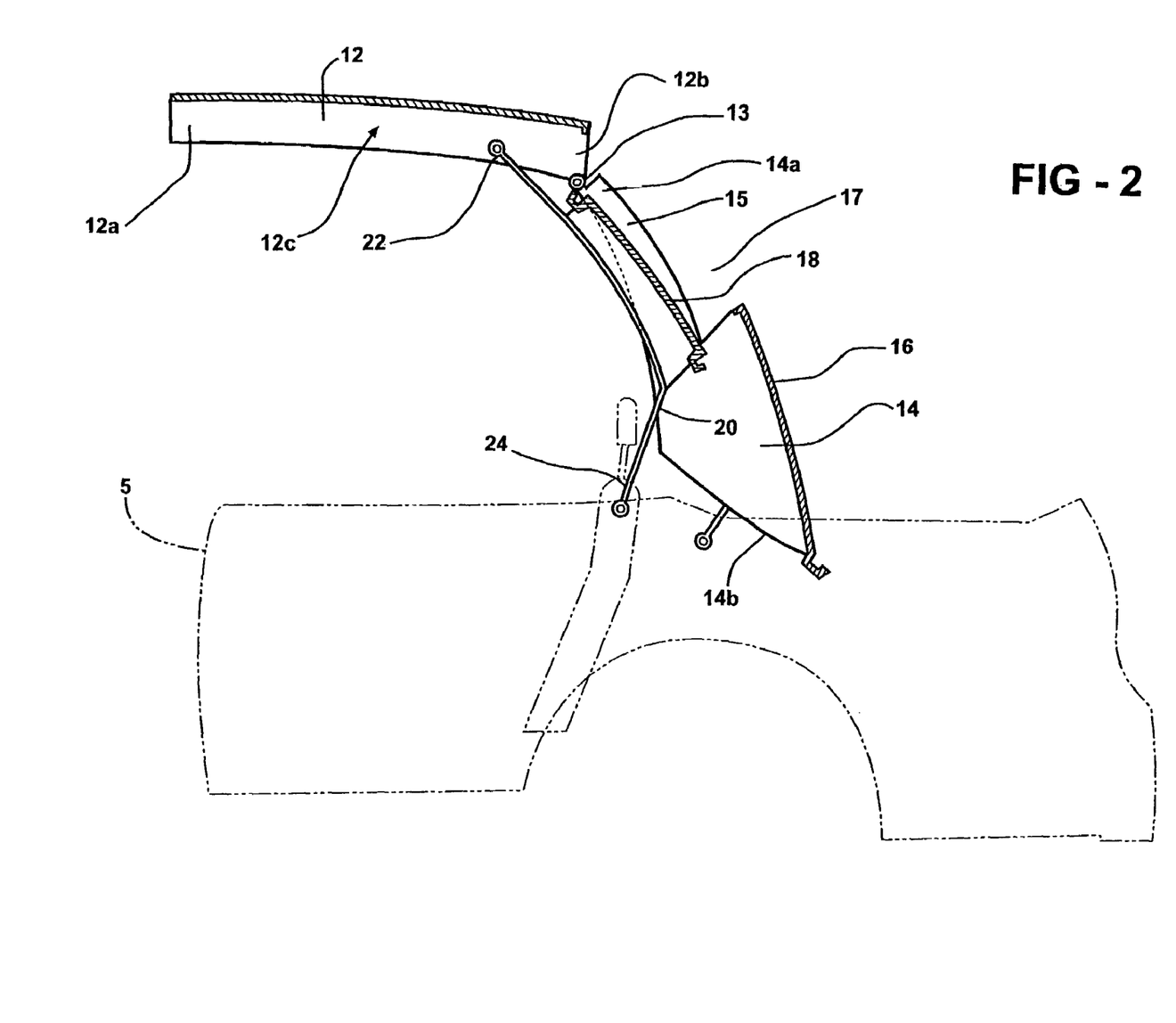
FIG. 2 is a side-elevational view of the retractable hardtop of FIG. 1, with the top in a partially retracted position.

As shown in FIG. 1, when the hardtop 10 is in the extended position, the front section 12, rear section 14 and center panel 18 cooperate to form a continuous rigid roof. The roof in the extended position covers the passenger compartment of the vehicle and the forward end 12a of the front section 12 abuts the top of the windshield. FIG. 2 illustrates the hardtop 10 at the beginning of its retraction. As the rear section 14 "flips over" or rotates clockwise, as viewed in the figures, the motion of the balance links 20 causes the center panel 18 to move away from the rear section 14. FIG. 3 illustrates the hardtop 10 in approximately the halfway retracted position, while FIG. 4 illustrates the hardtop 10 in yet a more retracted position. As shown, the rear section 14 has articulated further rearwardly, and the center panel 18 is further displaced by the balance links 20 from the rear section 14. Inner surfaces 12c and 14c of the front 12 and rear 14 sections move toward one another as the hardtop 10 continues its motion to the retracted position. Also, as the retractable hardtop 10 retracts from the extended position of FIG. 1 to the retracted position of FIG. 5, the front section 12 maintains its generally horizontal orientation.

FIG. 5 illustrates the hardtop 10 in the fully retracted position, and illustrates how additional storage area is provided. As is typical with retractable hardtops, the hardtop 10 is preferably stowed in what is otherwise the luggage compartment of the vehicle. A luggage separator is shown as 28. Normally, the separator 28 must extend rearwardly approximately at the level shown by a dotted line 28a to provide enough room for a clamshell retractable hardtop. However, the present invention provides significant additional storage area, as shown by line 29. The lines indicated by 29 illustrate an area between the two side portions 15 of the rear section, when it is stowed. This area extends upwardly to the underside of the front section 12 and fills the width available between the two side portions 15. This additional area is available because the center panel 18 has moved out of the way and into an area inside the rear section 14. Specifically, the center panel 18 is stored approximately adjacent the backlight 16 between the inner surfaces 12c and 14c of the front 12 and rear 14 sections, which is otherwise wasted space.

Referring now to FIGS. 6–9, a second embodiment of a retracted hardtop according to the present invention will be discussed. The hardtop 30 is similar to the first embodiment, but instead has three main sections instead of two. More specifically, the front section 32 of the hardtop 30 is now divided into a front panel 34 and a median panel 36 which are articulated with respect to one another. As with the previous embodiment, the rear section 38 includes the backlight 40 that extends between a pair of side portions 42. A center panel opening 43 is defined fore and aft between the median panel 36, the backlight 40 and laterally between the side portions 42. An articulating center panel 44 is positioned in the center panel opening 43. As with the previous embodiment, the center panel 44 is attached to a balance link 46, though the interconnection between the balance link 46 and center panel 44 is not shown in each of the figures. The center panel 44 moves with the balance link 46 and is displaced in and out of the center panel opening 43 during movement of the hardtop 30 between the extended position, shown in FIG. 6, and the retracted position, shown in FIG. 9, respectively. As should be clear to those of skill in the art, the center panel 44 may be connected to the balance link 46 in a variety of ways.

Figure 7:
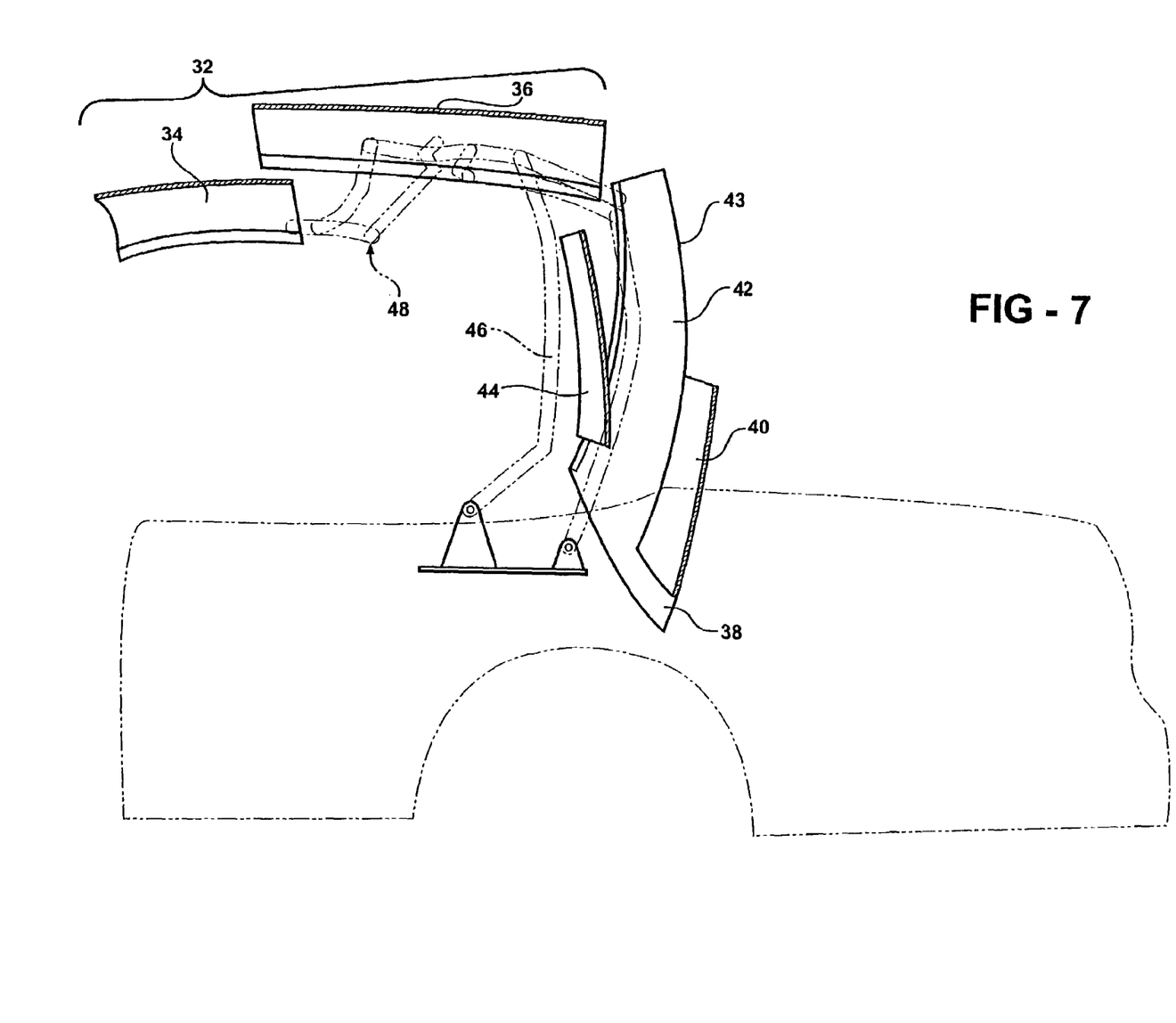
FIG. 7 is a side-elevational view of the second embodiment of the top in a partially retracted position.
Figure 8:
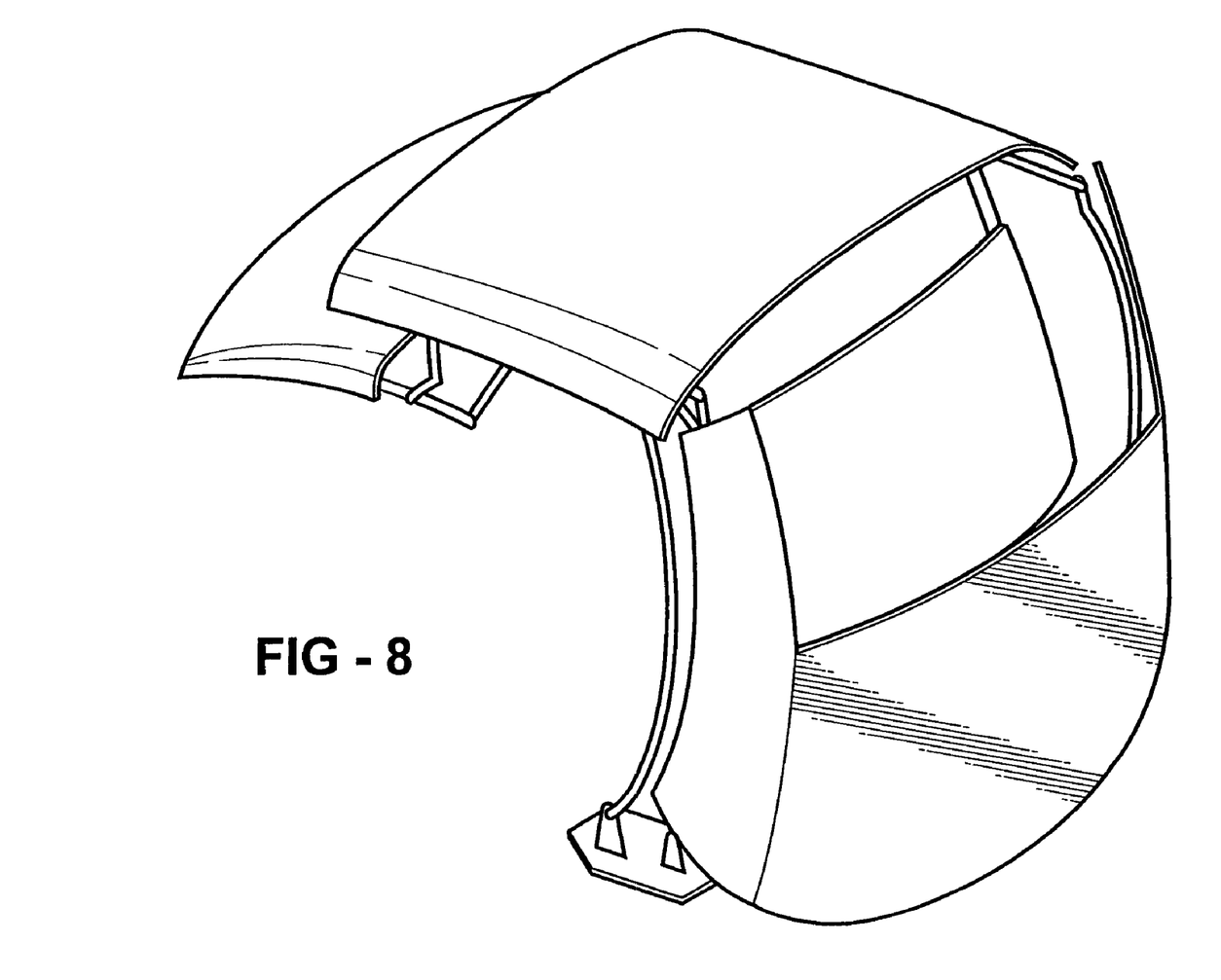
FIG. 8 is a perspective view of the second embodiment of the top in a partially retracted position.

In FIGS. 7 and 8, the top 30 is shown in a partially retracted position. A multi-link mechanism, generally indicated at 48, extends between the front 34 and median 36 panels. The multi-link mechanism 48 allows articulation of the front panel 34 with respect to the median panel 36. This mechanism 48 is driven by the relative motion of the rear section 38 and the median panel 36. Alternatively, the front panel 34 may slide with respect to the median panel 36, or may articulate in other ways than shown.

Figure 9:
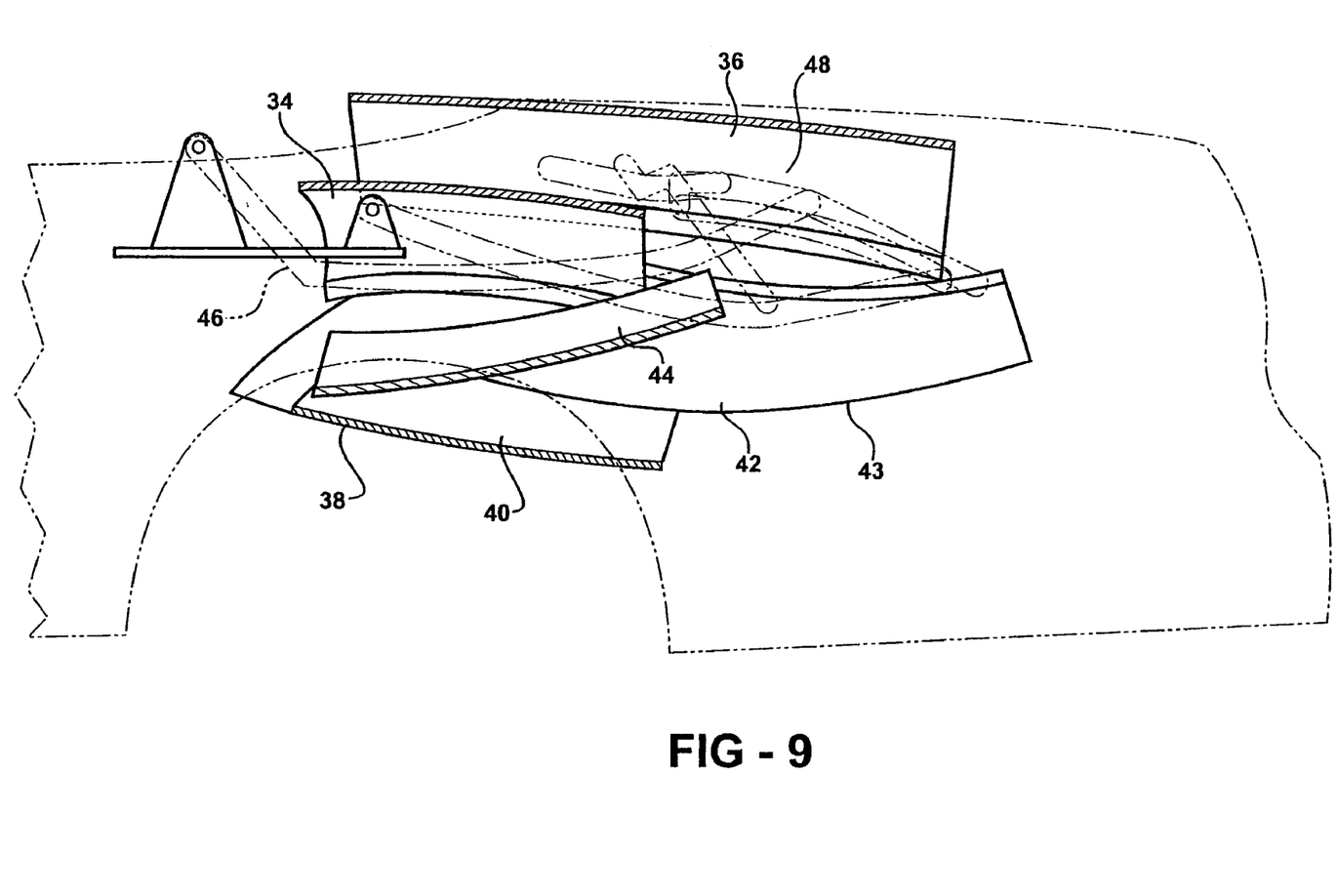
FIG. 9 is a side elevational view of the second embodiment of the top in a fully retracted position.

FIG. 9 shows the top 30 in the retracted position. As shown, the front panel 34 and center panel 44 are both stored between the rear section 38 and median panel 36.

One important consideration in the design of retractable hardtop systems is water management. That is, it is preferred to avoid dumping water from a wet retractable roof into the passenger compartment when the top is retracted. For the center panel, one approach to water management, according to the present invention, is to provide a water trough on one or more sides of the center panel and a drain tube that runs down the balance link. Then, as the center panel separates from the remainder of the roof, water may flow off the center panel into the water trough, and down the drain tube. Other approaches may also be used.

As will be clear to those of skill in the art, the embodiments of the present invention described herein may be altered in various ways without departing from the scope or teaching of the present invention.

I claim:

1. A retractable hardtop system for a vehicle having a body defining a passenger compartment extending between a front windshield and a rear storage area, the hardtop system being movable between an extended position, wherein the hardtop system defines a roof over the passenger compartment and a retracted position, wherein at least a portion of the hardtop system is disposed in the storage area, comprising:
a rear section having a pair of spaced apart side portions and a backlight extending laterally therebetween;
a front section extending forwardly from the rear section when the top is in the extended position;
a center panel opening defined between the rear and front sections, the center panel opening extending laterally between the side portions of the rear section;
a center panel filling the center panel opening when the top is in the extended position, the center panel remaining generally parallel with the rear section during movement of the top between the extended and retracted positions.

2. A retractable hardtop system as set forth in claim 1, further comprising a balance link having a first end in mechanical communication with the front section and a second end in mechanical communication with the vehicle body.

3. A retractable hardtop system as set forth in claim 2, wherein the center panel is interconnected with the balance link for movement therewith.

4. A retractable hardtop system as set forth in claim 2, wherein the balance link includes a mid-portion extending between the first and second ends, the mid-portion of the balance link being operatively connected to the center panel so that the center panel remains generally parallel with the balance link during movement of the hardtop between the extended and retracted positions.

5. A retractable hardtop system as set forth in claim 2, wherein the first end of the balance link is directly pivotally interconnected with the front section and the second end of the balance link is directly pivotally interconnected with the vehicle body.

6. A retractable hardtop system as set forth in claim 1, wherein the rear section includes a rearward end pivotally coupled with the vehicle body.

7. A retractable hardtop system as set forth in claim 6, wherein:
the rear section includes a forward end extending forwardly from the rearward end when the hardtop is in the extended position;
the front section includes a rearward end pivotally coupled to the forward end of the rear section;
the rear section includes an inner surface facing the passenger compartment when the hardtop is in the extended position; and
the front section includes an inner surface facing the passenger compartment when the hardtop is in the extended position.

8. A retractable hardtop system as set forth in claim 7, wherein the inner surfaces of the front and rear sections face each other when the hardtop is in the retracted position.

9. A retractable hardtop system as set forth in claim 8, wherein the center panel is disposed between the inner surfaces of the front and rear sections when the hardtop is in the retracted position.

10. A retractable hardtop system as set forth in claim 7, wherein with the top in the extended position:
the backlight has a forward end spaced rearwardly of the forward ends of the side portions of the rear section of the top system; and
the center panel opening has a forward edge defined by the rearward end of the front section, a rearward edge defined by the backlight, and a side edges defined by the side portions, the forward edge being generally aligned with the forward ends of the side portions.

11. A retractable hardtop system as set forth in claim 1, wherein the center panel has an inner surface facing the passenger compartment when the top is in the extended position, the inner surface of the center panel facing upwardly when the hardtop is in the retracted position.

12. A retractable hardtop system as set forth in claim 1, wherein the front section includes a median panel pivotally coupled to the rear section, the front section further including a front panel pivotally coupled to the median panel and extending between the median panel and the windshield when the hardtop is in the extended position.

13. A retractable hardtop system as set forth in claim 1, wherein the inner surface of the center panel faces upwardly when the hardtop is in the retracted position.

14. A retractable hardtop system for a vehicle having a body defining a passenger compartment extending between a front windshield and a rear storage area, the hardtop system being movable between an extended position, wherein the hardtop system defines a roof over the passenger compartment and a retracted position, wherein at least a portion of the hardtop system is disposed in the storage area, the hardtop system comprising:
- a rear section having a rearward end pivotally interconnected with the vehicle body and a forward end extending forwardly therefrom when in the extended position, the rear section having a pair of spaced apart side portions and a backlight extending laterally therebetween, the rear section having an inner surface that faces the passenger compartment when the hardtop is in the extended position;
- a front section having a rearward end pivotally interconnected with the forward end of the rear section and a forward end extending forwardly therefrom when in the extended position;
- a center panel opening defined between the rear and front sections, the center panel opening extending laterally between the side portions of the rear section;
- a balance link having a first end in mechanical communication with the front section and a second end in mechanical communication with the vehicle body;
- a center panel having an inner surface facing the passenger compartment and being generally contiguous with the inner surface of the rear section when the hardtop is in the extended position, the center panel being interconnected with the balance link for movement therewith, such that when the top is in the extended position, the center panel fills the center panel opening, and when the top is in the retracted position, the center panel moves out of the center panel opening and the inner surfaces of the center panel and the rear section face the same direction.

15. A retractable hardtop system as set forth in claim 14, wherein the balance link includes a mid-portion extending between the first and second ends, the mid-portion of the balance link being operatively connected to the center panel so that the center panel remains generally parallel with the balance link during movement of the hardtop between the extended and retracted positions.

16. A retractable hardtop system as set forth in claim 14, wherein the first end of the balance link is directly pivotally interconnected with the front section and the second end of the balance link is directly pivotally interconnected with the vehicle body.

17. A retractable hardtop system as set forth in claim 14, wherein the inner surfaces of the front and rear sections face each other when the hardtop is in the retracted position.

18. A retractable hardtop system as set forth in claim 17, wherein the center panel is disposed between the inner surfaces of the front and rear sections when the hardtop is in the retracted position.

19. A retractable hardtop system as set forth in claim 14, wherein with the top in the extended position:
- the backlight has a forward end spaced rearwardly of the forward ends of the side portions of the rear section of the top system; and
- the center panel opening has a forward edge defined by the rearward end of the front section, a rearward edge defined by the backlight, and a side edges defined by the side portions, the forward edge being generally aligned with the forward ends of the side portions.

20. A retractable hardtop system as set forth in claim 14, wherein the front section includes a median panel pivotally coupled to the rear section, the front section further including a front panel pivotally coupled to the median panel and extending between the median panel and the windshield when the hardtop is in the extended position.

* * * * *